United States Patent [19]

Babel

[11] Patent Number: 4,835,837
[45] Date of Patent: Jun. 6, 1989

[54] TOOL MAGAZINE

[75] Inventor: Werner Babel, Achweg, Fed. Rep. of Germany

[73] Assignee: MAHO Aktiengesellschaft, Pfronten, Fed. Rep. of Germany

[21] Appl. No.: 31,532

[22] Filed: Mar. 27, 1987

[30] Foreign Application Priority Data

Apr. 18, 1986 [DE] Fed. Rep. of Germany ....... 3613206

[51] Int. Cl.⁴ .............................................. B23Q 3/157
[52] U.S. Cl. ..................................... 29/568; 29/26 A
[58] Field of Search ................. 82/36 A, 2 B; 29/568, 29/26 A; 211/1.5

[56] References Cited

U.S. PATENT DOCUMENTS

| 3,715,801 | 2/1973 | Sato et al. | 29/568 |
| 3,979,819 | 9/1976 | Nomura et al. | 29/568 |
| 4,306,350 | 12/1981 | Kielma et al. | 29/568 |
| 4,577,389 | 3/1986 | Schultz | 29/568 |
| 4,590,662 | 5/1986 | Norota | 29/568 |
| 4,665,607 | 5/1987 | Ressencourt | 29/568 |

Primary Examiner—Frederick R. Schmidt
Assistant Examiner—William E. Terrell
Attorney, Agent, or Firm—Baker, Maxham, Jester & Meador

[57] ABSTRACT

The invention concerns a tool magazine for program-controlling machine tools, comprising a supporting structure, a holder including the tool receptacles, and a program-controlled electrical drive mechanism for moving the holder together with the tool receptacles to predetermined positions for a change of tools. In accordance with the invention the tool holder is subdivided into a plurality of exchangeable segments adapted to be transported by way of a transfer apparatus to and from the magazine and to be assembled therewith and disassembled therefrom.

2 Claims, 5 Drawing Sheets

TOOL MAGAZINE

FIELD OF THE INVENTION

The invention generally concerns machine tool magazines and more particularly relates to program-controlled machine tools with a magazine structure to facilitate replacement of tool elements.

DISCUSSION OF THE PRIOR ART

With the development of machining centers, as they are called, and of flexible production systems, there has been a natural increase in the demands made on the tool changing systems. There are increasing requirements for enabling fully automatic machining of workpieces, such machining being comprised of a multiplicity of different operations. The fully automatic long-term operation of a program-controlled machining center is limited, among other things, by the maximum life of the tools utilized. Moreover, there normally is the problem that certain tools are used more frequently or for longer periods than others, or both, for machining workpieces. These tools tend to wear more quickly. The worn tools must then be replaced in the tool magazine by fresh ones which, in the case of conventional disk or chain magazines, causes relatively frequent interference in the machining operation because loading of the respective magazine with tools must normally be performed manually while the machine is shut down. Finally, special requirements for tool changing systems also occur in cases of the more recently conceived multi-spindle automatic machines in which several similar workpieces are simultaneously machined. In these automatic machines a tool magazine normally supplies at least two working spindles, each with the same tools, which must then also be stored in the magazine in corresponding large numbers.

Up to now, the problems briefly discussed above have been met by enlarging the storage capacity of the machine tool. However, there are limits in this direction because enlargement of the magazine results in increased space demands and weight thereof, at least to the same extent and because also the construction of auxiliary units such as supports and drive means must be increased accordingly. This leads to considerable difficulties as to the positioning of the respective magazines on the machine tool and in respect of design and arrangement of the tool changing means. Furthermore, an increase in the storage capacity of the magazines leads to longer overall changing times, because the transport paths of the individual tools in the magazine to the defined changing position are statistically increased. This results in the machining performance of the entire machine being detrimentally affected.

SUMMARY OF THE INVENTION

It is the object of the invention to provide a tool magazine for program-controlled machine tools, the storage capacity of the magazine being adaptable to the machining and operating conditions where the magazine also permits improved utilization of the machine tool.

To accomplish the desired results, the tool holder is subdivided into a plurality of segments which are easily and quickly exchangeable. Subdividing the tool holder, for instance the disk, the chain or the like, into a plurality of segments or single sections and providing exchangeable disposition thereof in the magazine offers many advantageous operational possibilities. For instance, the tools which are used particularly frequently for machining a single workpiece and which are subjected to high loads may be combined in a segment or certain segments and may be replaced by exchanging these segments as a unit, whereby the setup times can be correspondingly reduced. Moreover, for long-term operation (by successive operating shifts of laborers) of a machine tool which is integrated in a flexible production system, this invention makes it possible to assemble the tools required for machining one type of workpiece in one or several predetermined magazine segments, and to assemble the tools required for further types of workpieces in other predetermined magazine segments. The same also applies to multi-spindle automatic machines in which the tools for the single spindles may likewise be arranged in the magazine so as to be exchangeable in groups.

The technical concept of the invention may be applied with suitable structural modifications to different types of magazines. For instance, in so-called disk magazine the disk-shaped holders may be composed of single segments, each segment being fixed in the disk by way of fixing means and secured by way of suitable locking means and capable of being disassembled after release thereof. Each segment may include one or several receptacles for the tools or the taper tool shanks. In the case of chain magazines the chain may be composed of relaseably coupled single links or chain sections of predetermined length. A unit which is, for instance, disposed in the rear portion of the chain path detaches the previously selected chain links or chain sections, or both, from the chain system and automatically replaces them by chain sections previously loaded with fresh tools.

It is one of the significant advantages of the concept according to the invention that the magazine segments or sections may be prepared in the shop and made available directly at the machine tool so that they can automatically replace, as required in accordance with the respective control program, magazine segments loaded with "worn" tools. Thereby the number of necessary interfering steps in the operation of the machine tool is substantially reduced and accordingly the performance and efficiency of the machine tool is improved. Furthermore, the degree of automation of complex production systems may also be increased in a relatively simple manner, because the completely prepared magazine segments may automatically be conveyed to their ready positions, for instance, on automated floor conveyors.

BRIEF DESCRIPTION OF THE DRAWING

The objects, advantages and features of the invention and suitable further developments and improvements thereof will be more apparent from the following detailed description, when read in conjunction with the accompanying drawing, in which.

DESCRIPTION OF THE PREFERRED EMBODIMENTS

Figure 1:
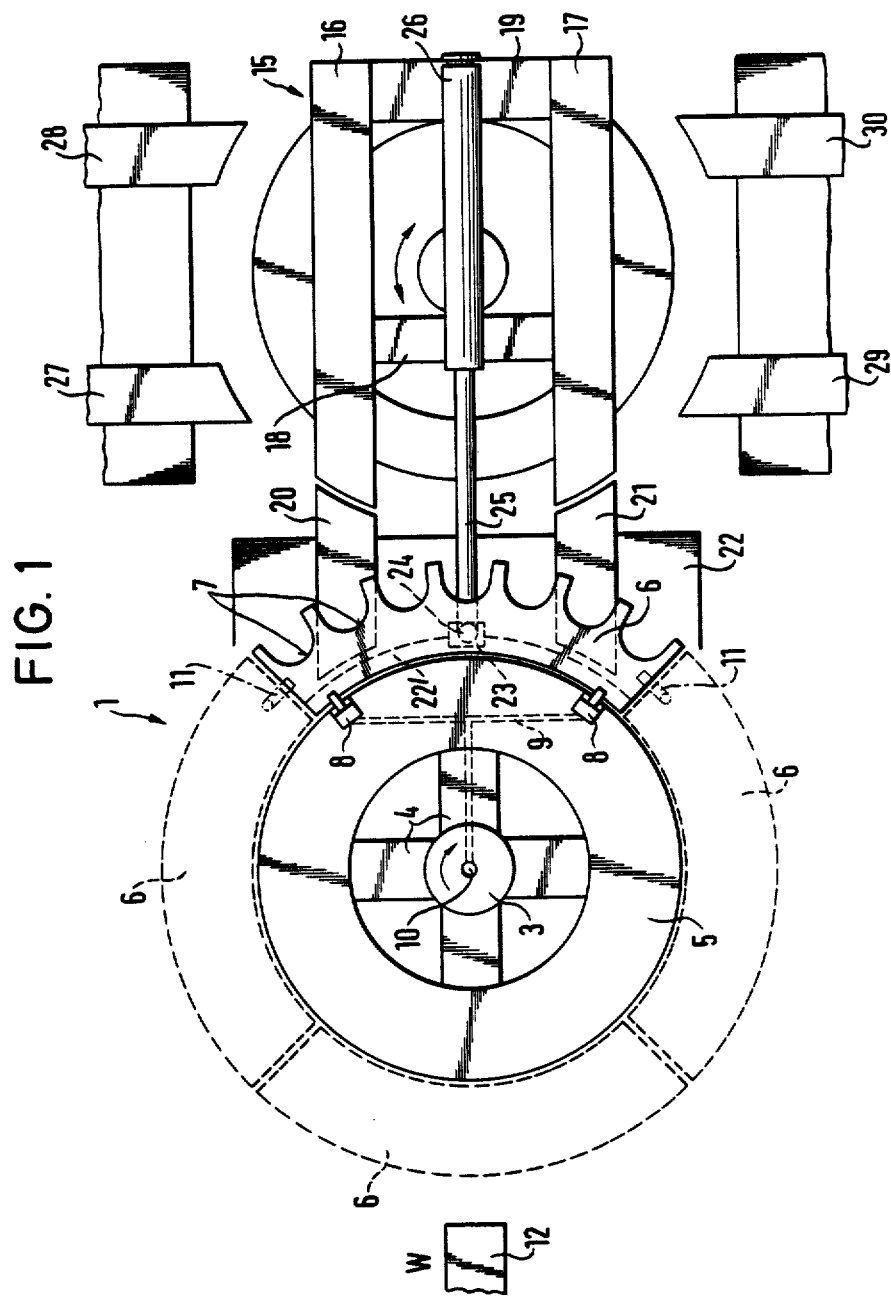
FIG. 1 is a schematic plan view showing a disk magazine as a first embodiment of the invention.

In the embodiment shown in FIG. 1, disk magazine 1 is mounted, for instance, on a typical headstock (not illustrated). The magazine disk comprises supporting spider 4 attached to central column 3 and including dimensionally stable supporting ring 5 rigidly mounted on the ends of the arms of the supporting spider, and four ring segments 6. In the assembled condition the ring segments constitute the annular tool holder, the outer rims of which each comprise several tool receptacles 7 having clamping or locking retainers for the tapered tool shanks. Each of the four ring segments 6 may be separately disassembled from and assembled with the magazine. In the assembled condition illustrated in FIG. 1, locking elements 8 are effective for securing the ring segments to supporting ring 5. The locking elements may be collets which are common in machine tool engineering, having their hydraulic cylinders fitted into supporting ring 5 which are communicated by ducts 9 to hydraulic fluid passages 10 provided in column 3. Instead of using the collets it is also possible to use other fastening elements for fixing the ring segments to the supporting ring and to each other. Such fastening elements may be operable mechanically, hydraulically, pneumatically or even electrically and ensure a sufficiently dimensionally stable and vibration-free retaining of the ring segments on the supporting ring and relative to each other, respectively. In Fig.1, pivotable bolts 11 are indicated in dash-dot lines for mutually supporting and additionally retaining together two respective adjacent ring segments.

For a change of tools the magazine disk is rotated by means of a conventional drive motor (not illustrated) until the selected tool or an empty position is opposite tool changing unit 12 in changing position W. Each tool is thereby equally accessible to the tool changing unit. To this extent the function and mode of operation of the disk magazine is in accordance with standard designs.

In the illustrated embodiment, the transfer assembly for the individual segments is turntable 15 on which two guide tracks 16, 17 are mounted in parallel side-by-side relationship and are mutually stiffened by cross members 18, 19. Turntable 15 is capable of being rotated in either direction of rotation about at least 180° by means of a conventional drive mechanism (not illustrated). Guide tracks 16, 17 are in alignment with stationary track sections 20, 21 which are, for instance, fixedly mounted on supporting structure 22 of magazine disk 1 such as on a portion of the headstock. Said guide track sections 20, 21 extend beneath the edge of magazine disk or ring segment 6. On its radially inward edge ring segment 6 has a downwardly depending ring segment-shaped extension 22' which is indicated in dashed lines in FIG. 1. Opening 23 for engagement of locking hook or bolt 24 provided on the end of piston rod 25 is formed centrally in ring segment-shaped extension 22'. Piston rod 25 forms part of hydraulic pressure cylinder unit 26 mounted on turntable 15 and supplied with hydraulic fluid via conduits (not illustrated). A respective pair of fixedly mounted guide tracks 27, 28 and 29, 30 terminates on either side of turntable 15. These guide tracks 27-30 are disposed and designed in such a way as to be in alignment with the two guide tracks 16, 17 of turntable 15 when the latter is rotated by 90° in one or the other direction from its illustrated position.

For disassembly of a ring segment 6 from the position illustrated in FIG. 1, piston 25 of cylinder unit 26 is extended until the free end of hook 24 engages in opening 23, where it is fixed by suitable means such as a spring clip. At the same time collets 8 are supplied with pressurized oil via the conduit 9 to be thereby released. By subsequent retraction of piston 25 detached segment 6 is pulled onto a pallet (not illustrated in FIG. 1) and moved with the same along tracks 20, 21 onto turntable 15. By subsequent rotation of turntable 15 into alignment with the pair of tracks 27, 28 or 29, 30 and subsequent extension of piston rod 25 magazine segment 6, which contains the worn tools, is moved to a store position. Upon retraction of piston rod 25 and rotation about 180°, a fresh segment 6 disposed on a pallet may be gripped and moved by piston 25 onto tracks 16, 17 of turntable 15. After a return movement of the turntable about 90° guide tracks 16, 17 thereof will again be aligned with track sections 20, 21 so that the fresh segment may be brought into the operative position and fixed to supporting ring 5 by actuation of collets 8. The changing operation is completed following release of hook 24 and retraction of piston rod 25.

Figure 2:
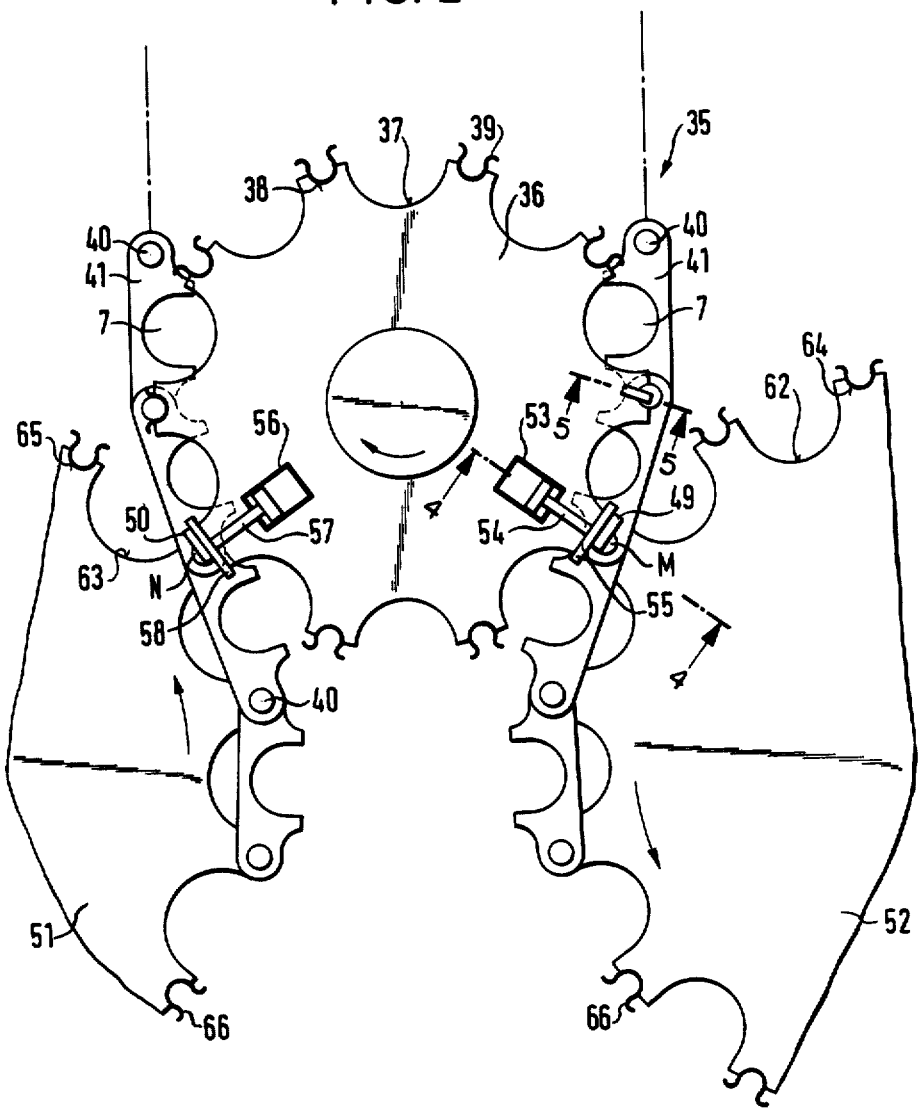
FIG. 2 is a schematic plan view showing a further embodiment of the invention in the form of a chain magazine including means for changing chain sections.

The embodiment illustrated in FIG. 2 concerns a chain magazine in which endless chain 35 containing the tool receptacles is trained around several chain wheels 36, only one of said wheels being illustrated. By program-controlled driving of at least one of said chain wheels 36 selected tool receptacles 7 are moved to the changing position. Endless chain 35 comprising tool receptacles 7 is composed of several chain sections which are detachably joined to each other by means of specially designed hinge pins. The outer periphery of each chain wheel 36 is formed with semi-circular cut-outs 37, and the intermediate projections defined by cut-outs 37 are formed with semi-circular cut-outs 38 in which spring clips 39 are seated. These spring clips 39 are used as fixing elements for fixing hinge pins 40 that join chain links 41.

As will be apparent from FIGS. 3–6, central portion 42 of each hinge pin 40 is flattened on either side. Each chain link 41 is provided in the vicinity of its one hinge eye 43 with radial cut-out 44 transverse to the longitudinal axis of the link, the width of the cut-out being sightly greater than the diameter of the pin shank in flattened portion 42. Diametrically opposite to cut-out 44 trunnion 45 is mounted in chain ink 41' (FIGS. 3, 4), the trunnion being oriented transversely to the longitudinal axis of the link and having enlarged head 46 at its free end.

Figure 5:
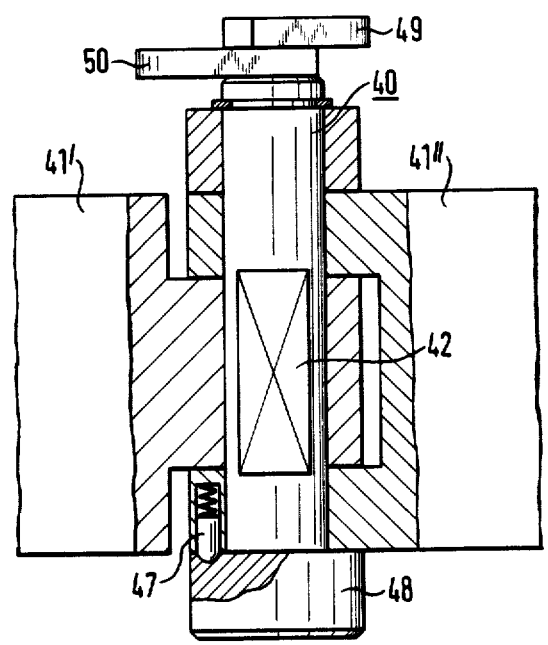
FIG. 5 is a longitudinal sectional view through a chain link taken along cutting plane 5—5 in FIG. 2.

With respect to FIG. 5, a rotation preventing means for hinge pin 40 is provided in the form of spring-loaded peg 47 on one end of each chain link 41", the peg resiliently engaging with its rounded end in at least one depression in the interior surface of one hinge pin head 48. The other end of hinge pin 40 has two transverse pegs 49, 50 fixed thereto at an acute angle relative to each other and extending transversely to the longitudinal axis of the pin (see FIGS. 5 and 6).

Figure 6:
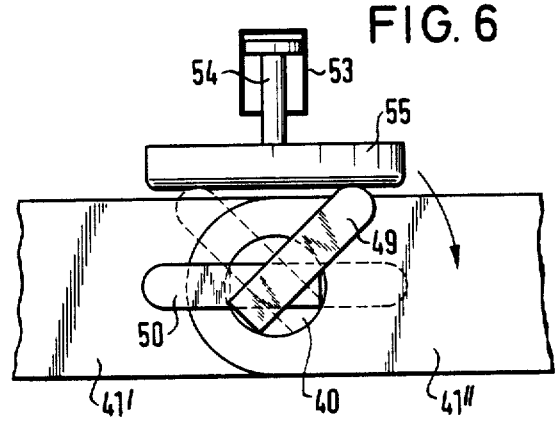
FIG. 6 is a plan view of a chain link including the hydraulic cylinder for rotating the hinge pin.

As shown in FIG. 2, two further chain wheels 51,52 are provided directly adjacent chain wheel 36. Left-hand chain wheel 51 in FIG. 2 carries a fresh chain section to be assembled with the endless chain and right-hand chain wheel 52 is used to remove a chain section to be disassembled from the endless chain. For purposes of delineation, wheel 36 may be termed a magazine chain wheel and wheels 51 and 52 may be called delivery chain wheels. At position M a linear motor in the form of hydraulic cylinder 53 is disposed so as to be stationary and radial to chain wheel 36, piston rod 54 thereof having slide 55 mounted thereon. This linear drive means 53, which is also illustrated in FIG. 6, acts on transverse peg 49 mounted on the free end of respective hinge pin 40 for rotating the hinge pin about the longitudinal axis thereof. A further, similar linear drive means 56 is fixedly disposed at position N in FIG. 2 radially to chain wheel 36. Piston rod 57 thereof likewise has slide 58 mounted thereon for engaging transverse peg 50 of hinge pin 40 to rotate the latter about its longitudinal axis in counter-clockwise direction.

Figure 4:
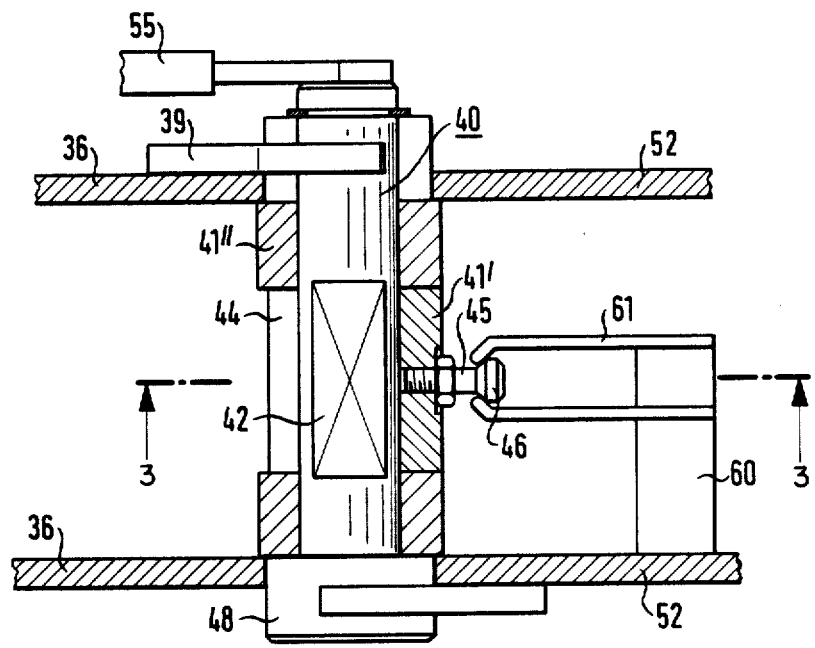
FIG. 4 is a longitudinal sectional view through a chain link taken along cutting plane 4—4 of FIG. 2.

As will be apparent from FIG. 4, each chain wheel 36, 51, 52 consists of two identically shaped plates or disks which are disposed in axially spaced relationship corresponding to the height of the chain link and are mounted on shafts. Intermediate the two plates of chain wheels 36 and 52, tweezers 61 are secured to posts 60 (see FIG. 4), said tweezers engaging about enlarged heads 46 of transverse trunnions 45. Moreover, each chain wheel 51, 52 is provided about the periphery of each plate with semi-circular cut-outs 62, 63 and semi-circular cut-outs 64, 65 including spring clips 66 secured therein. These correspond to elements 37—39 of chain wheel 36 as regards their function and configuration.

Figure 3:
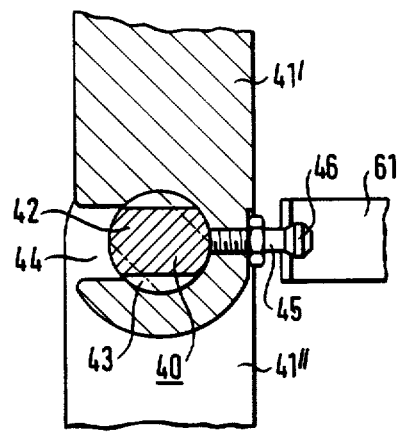
FIG. 3 is a sectional view taken along cutting plane 3—3 of FIG. 4 showing a chain link.

Operation of the embodiment illustrated in FIGS. 2–6 will now be described. When a chain section composed of one or several chain links of the chain magazine including the respective tools is to be replaced, the endless chain is moved to a position indicated at M in the right-hand part of FIG. 2, in which the hinge pin joining the chain section to the remaining chain is exactly opposite linear motor 53. By actuation of the linear motor and extension of piston 54 thereof, slide 55, which is transversely secured to the free end of piston 54, urges transverse peg 49 secured to the head end of hinge pin 40 from the oblique position illustrated in dash-dot lines. Hinge pin 40 is thereby rotated by a predetermined amount so that the two flat side faces of its flattened central shank portion 42 will be oriented in parallel to the limiting surfaces of radial cut-out 44 as illustrated in FIG. 3. By synchronous rotation of chain wheels 36 and 52, tweezers 61, which are in engagement about enlarged head 46, hold incoming chain link 41' at the outer periphery of chain wheel 52 while at the same time shank portion 42 of hinge pin 40 sides out of radial cut-out 44 of chain link 41. Hinge pin 40 and therefore also the end of the remaining endless chain will be retained by partially overlapping spring clip 39 in semi-circular cut-out 38 of chain wheel 36, so that the end portion of the remaining endless chain on chain wheel 36 is still securely guided. The chain section to be replaced, which commences with chain link 41' according to FIG. 3, is moved by synchronous continued rotation of chain wheels 36 and 52 onto chain wheel 52 and it taken over by the latter. Releasing of the last chain link of this chain section to be replaced is performed in the same way by stopping the chain in the position M and rotating the respective hinge pin by actuation of linear drive means 53, 54, 55.

Feeding as well as connecting of a fresh chain section to be exchanged for the old one is performed by means of the chain wheel 51 shown on the left-hand side of FIG. 2. On the periphery of chain wheel 51 the chain section to be inserted is retained by spring clips 65 in overlapping engagement with hinge pins 40. When the last link of the endless chain and, in synchronism therewith, the first link of the fresh chain section reach the position N, the hinge pin which is in the position shown in FIG. 3 will automatically engage in radial cut-out 44 of the first link of the newly arriving chain section. By actuation of linear motor 56 and movement of piston 57 and slide 58 thereof, slide 58 will act on second transverse peg 50 at the free end of hinge pin 40 (FIG. 5) so that the peg is moved to the parallel position shown in solid lines in FIG. 6. This rotates hinge pin 40 to such an extent that flattened shank portion 42 thereof can no longer pass through radial recess 44 of the chain link. Thereby the fresh chain section will have been joined to the last link of the endless chain. A corresponding operation is repeated between the last link of the fresh chain section and the first link of the endless chain.

Figure 7:
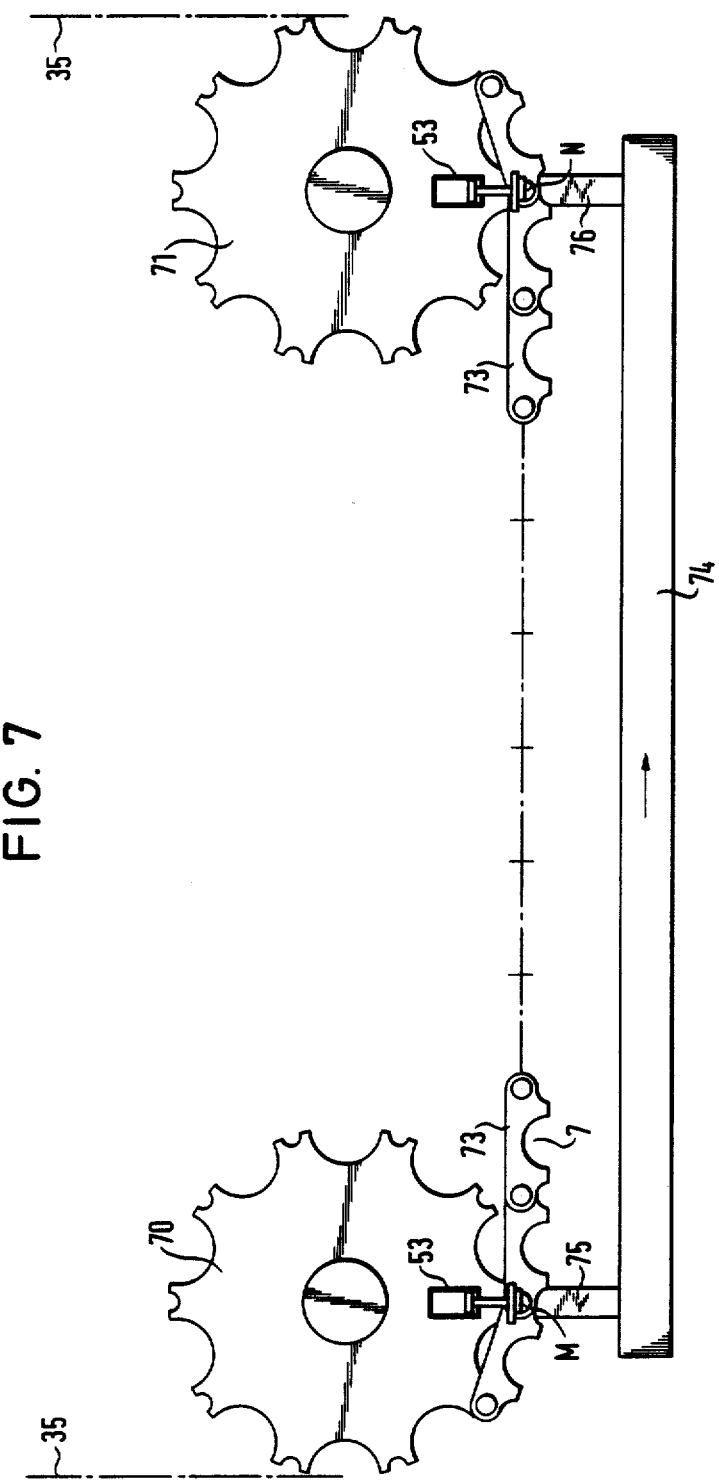
FIG. 7 is a schematic plan view showing a further embodiment of the invention.

In the embodiment shown in FIG. 7, a predetermined chain section whose length corresponds to the axial distance between chain wheels 70, 71 can be exchanged simultaneously. Structure and function of chain wheels 70, 71 correspond to those of chain wheel 36 in FIG. 2.

For simultaneously releasing the hinge pins at the positions M and N two linear drive mechanisms 53, which are similar to linear drive means 53 of FIG. 2, are used. Chain section 73 removed from the endless chain 35 is taken over by a holding member 74 which includes transverse elements 75, 76 with corresponding take-up holders and may be mounted on an automotive carriage or the like. The transfer and changing operations substantially correspond to those of the embodiment illustrated in FIGS. 2–6.

The invention is not limited to the illustrated embodiments. It is possible, for instance, to combine the measures illustrated in FIGS. 1 and 2 in such a way that the outer periphery of the magazine disk has mounted thereon an endless chain with tool receptacles, wherein the individual sections of the chain are then suitably exchanged in accordance with the embodiment of FIG. 2.

What is claimed is:

1. A tool magazine apparatus for program-controlled machine tools having a working tool holder in a working spindle, and a changing unit to transfer a tool between said working tool holder and said magazine, said apparatus comprising:
    a program-controlled electrical drive mechanism;
    supporting structure comprising a rotatably driven disk having a supporting ring movably coupled to said drive mechanism;
    tool holder means mounted to said supporting structure for rotation therewith, said tool holder means comprising a plurality of exchangeable accurate tool holder segments mounted radially of said supporting ring to thereby form an annular ring with respect thereto, said annular ring of segments having an outer circumference;
    a plurality of tool receptacles formed in the outer circumference of each said too holder segment, said drive mechanism moving said supporting structure to selectively align said receptacles with a predetermined changing position with respect to the working spindle, each tool in said tool holder means being equally accessible to the changing unit for transfer to the working spindle by the changing unit selective rotation of said supporting structure;

transfer assembly means configured to selectively disassemble one of said tool holder segments from said supporting structure, transfer said disassembled segment to a storage location distinct from said transfer assembly means, fetch a replacement annular tool holder segment from storage and to assemble said replacement tool holder segment into said supporting structure to make tools selectively available to said working spindle tool holder; and means for rotating said transfer assembly means about an axis parallel to said supporting structure;

said transfer assembly means being selectively rotatable and further comprising guide means for supporting said tool holder segments when they are being exchanged.

2. A tool magazine apparatus for program-controlled machine tools having a working tool holder in a working spindle, and a changing unit to transfer tools one at a time between said working tool holder and said magazine, said apparatus comprising:

a program-controlled electrical drive mechanism;

supporting structure movably coupled to said drive mechanism;

tool holder means mounted to said supporting structure for rotation therewith, said tool holder means comprising a plurality of exchangeable tool holder segments mounted radially of said supporting structure, said segments being arranged generally in a plane and forming an annular ring with respect thereto, said annular ring of segments having an outer edge;

at least one tool receptacle formed in said outer edge of each said tool holder segment, each said tool receptacle being configured to hold a single tool and being arranged circumferentially and generally equidistant from said supporting structure, said drive mechanism moving said supporting structure to selectively align said receptacles with a predetermined changing position with respect to the working spindle, each tool in said tool holder means being equally accessible when in said magazine to the changing unit for transfer to the machine tool working spindle upon selective movement of said supporting structure, said receptacles and said movement thereof being generally in said plane;

transfer assembly means configured to selectively disassemble said tool holder segments from said supporting structure, transfer said disassembled segments to a storage location distinct from said transfer assembly means, fetch replacement tool holder segments from storage and to assemble said replacement tool holder segments into said supporting structure to make tools selectively available to said working spindle tool holder; and means for rotating said transfer assembly means;

said transfer assembly means being selectively rotatable and further comprising guide means for supporting said tool holder segments when they are being exchanged.

* * * * *